United States Patent
Zhang et al.

(10) Patent No.: US 8,332,763 B2
(45) Date of Patent: Dec. 11, 2012

(54) AGGREGATING DYNAMIC VISUAL CONTENT

(75) Inventors: Jiajun Zhang, Shanghai (CN); Yin Liu, Sammamish, WA (US); Shenhua Gu, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 12/481,143

(22) Filed: Jun. 9, 2009

(65) Prior Publication Data

US 2010/0313149 A1 Dec. 9, 2010

(51) Int. Cl.
*G06F 3/00* (2006.01)
*G06F 3/048* (2006.01)

(52) U.S. Cl. ........ 715/760; 715/255; 715/803; 715/841; 715/853; 715/854

(58) Field of Classification Search .................. 715/803, 715/834, 841, 255, 267, 760, 853, 854
See application file for complete search history.

(56) References Cited

U.S. PATENT DOCUMENTS

| | | | | |
|---|---|---|---|---|
| 5,101,425 A | * | 3/1992 | Darland et al. | 379/32.01 |
| 5,941,944 A | * | 8/1999 | Messerly | 709/203 |
| 6,047,320 A | * | 4/2000 | Tezuka et al. | 709/223 |
| 6,462,762 B1 | * | 10/2002 | Ku et al. | 715/853 |
| 6,537,325 B1 | * | 3/2003 | Nishizawa | 715/267 |
| 6,725,425 B1 | | 4/2004 | Rajan | |
| 6,732,090 B2 | * | 5/2004 | Shanahan et al. | 1/1 |
| 6,918,090 B2 | | 7/2005 | Hesmer | |
| 6,934,749 B1 | * | 8/2005 | Black et al. | 709/224 |
| 6,985,912 B2 | * | 1/2006 | Mullins et al. | 1/1 |
| 7,028,306 B2 | * | 4/2006 | Boloker et al. | 719/310 |
| 7,058,695 B2 | * | 6/2006 | Takagi et al. | 709/217 |
| 7,117,432 B1 | * | 10/2006 | Shanahan et al. | 715/210 |
| 7,240,067 B2 | | 7/2007 | Timmons | |
| 7,581,170 B2 | * | 8/2009 | Baumgartner et al. | 715/234 |
| 7,917,846 B2 | * | 3/2011 | Decker et al. | 715/234 |
| 2006/0026557 A1 | | 2/2006 | Petri | |
| 2006/0271834 A1 | | 11/2006 | Wang | |
| 2008/0120368 A1 | * | 5/2008 | Gale et al. | 709/203 |
| 2008/0306913 A1 | | 12/2008 | Newman | |
| 2008/0307301 A1 | * | 12/2008 | Decker et al. | 715/241 |
| 2009/0030891 A1 | * | 1/2009 | Skubacz et al. | 707/5 |

OTHER PUBLICATIONS

Readwriteweb, "My Yahoo! Gets Web 2.0 Makeover," Apr. 1, 2009, 4 pp, http://www.readwriteweb.com/archives/my_yahoo_web20_makeover.php.
Netvibes Company Profile, "CrunchBase Advanced Search," Apr. 1, 2009, 8 pp, http://www.crunchbase.com/company/netvibes.

(Continued)

*Primary Examiner* — Nicholas Augustine
(74) *Attorney, Agent, or Firm* — Shook Hardy & Bacon LLP

(57) ABSTRACT

Methods, systems, and computer-readable media that allow a user to select and add subsections of multiple websites to a single aggregated website that will automatically retrieve updated content corresponding to the selected subsection are provided. The content from the selected subsections may be displayed on the aggregated website. The aggregated website will periodically check a source website and update the content displayed on the aggregated site if the source website has been updated. The application generating the source website determines which subsection of the updated website corresponds with the subsection originally selected for display by comparing the document object model ("DOM") for both the updated web page and the original version of the web page at the time the subsection selection was made by the user. Condensed DOM trees may be generated for the updated web page and the original version of the web page, prior to comparing the two DOM trees.

16 Claims, 12 Drawing Sheets

OTHER PUBLICATIONS

Apple—Mac OS X Leopard, "Features—300+ New Features," 14 pp., Apr. 1, 2009, http://www.apple.com/macosx/features/300.html#dashboard.

Fabian Pattberg.com, "Use iGoogle to Make Your Day More Productive," Aug. 18, 2008, 5 pp., http://www.fabianpattberg.com/2008/08/use-igllgle-to-make-your-day-more-productive/.

Michael Arrington, "TechCrunch, Profile—MSN Start.com," Aug. 3, 2005, Company: Start.com launched Jun. 3, 2005, 9 pp, http://www.techcrunch.com/2005/08/03/profile-msn-startcom/.

Dennis Shasha and Kaizhong Zhang, Courant Institute of Mathematical Sciences, New York University, 251 Mercer Street, New York, NY 10012 U.S.A., "Fast Parallel Algorithms for the Unit Cost Editing Distance Between Trees (extended abstract)," 10 pp., Jun. 8, 2009, http://delivery.acm.org/10.1145/80000/72949/p117-shasha.pdf?key1=72949&key2=1401948321&coll=GUIDE&dl=GUIDE&CFID=28302391&CFTOKEN=54450191.

\* cited by examiner

AGGREGATING DYNAMIC VISUAL CONTENT

BACKGROUND

Currently, web pages regularly update content displayed to users. For example, an online news site may update the top news stories every hour. Pictures and videos accompanying the news stories may also change. A user that is interested in the current content of multiple web pages needs to visit each site individually to retrieve the updated content. Some websites combine content from multiple content providers on a single website.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention allow a user to select and add subsections of multiple websites to a single aggregated website that will automatically retrieve updated content corresponding to the selected subsection. The content from the selected subsections may be displayed on the aggregated website. The aggregated website will periodically check a source website and update the content displayed on the aggregated site if the source website has been updated. The application generating the source website must determine which subsection of the updated website corresponds with the subsection originally selected for display. The subsection of the updated source website that corresponds with the subsection selected by the user is determined by comparing the document object model ("DOM") for both the updated web page and the original version of the web page at the time the subsection selection was made by the user. Condensed DOM trees may be generated for the updated web page and the original version of the web page, prior to comparing the two DOM trees.

BRIEF DESCRIPTION OF THE DRAWINGS

Embodiments of the invention are described in detail below with reference to the attached drawing figures, wherein.

DETAILED DESCRIPTION

Figure 1:
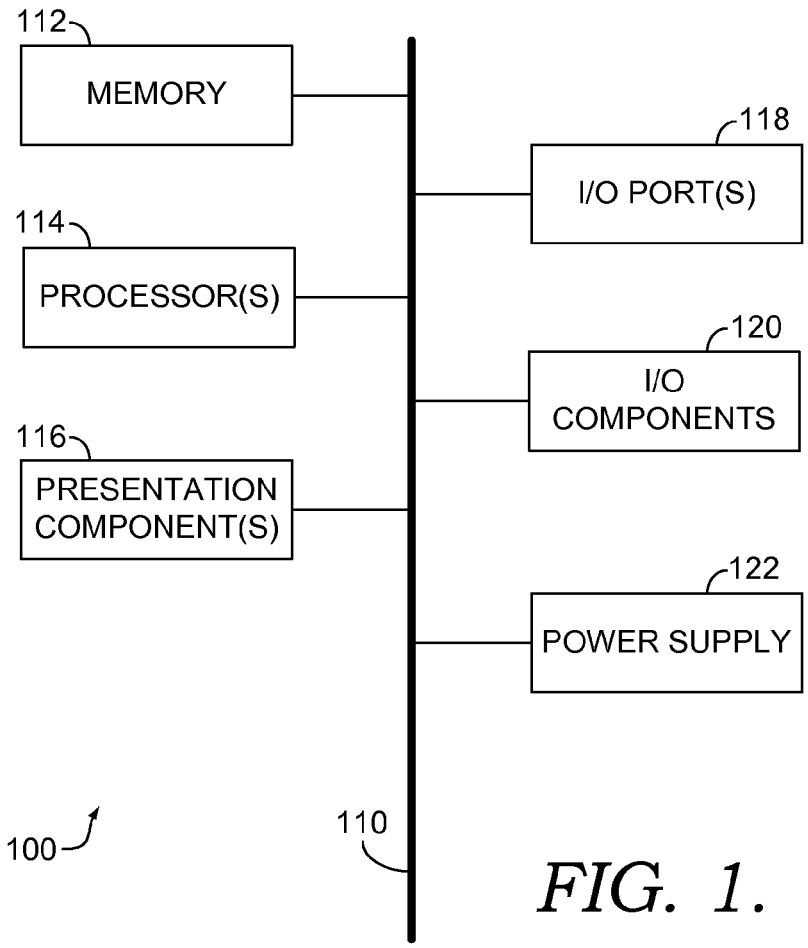
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention allow a user to select and add subsections of multiple websites to a single aggregated website that will automatically retrieve updated content corresponding to the selected subsection. The content from the selected subsections may be displayed on the aggregated website. The aggregated website will periodically check a source website and update the content displayed on the aggregated site if the source website has been updated. The application generating the source website must determine which subsection of the updated website corresponds with the subsection originally selected for display. The subsection of the updated source website that corresponds with the subsection selected by the user is determined by comparing the document object model ("DOM") for both the updated web page and the original version of the web page at the time the subsection selection was made by the user. Specifically, a sub-tree corresponding to the selected subsection with a DOM tree for the web page version at the time the portion was selected is compared with the DOM tree for the updated web page. The sub-tree within the DOM tree from the updated web page that most closely corresponds with the sub-tree of the DOM tree that corresponds to the selected portion may be selected for display on the aggregated website.

In one embodiment, the DOM trees are preprocessed to generate condensed DOM trees. As explained in more detail subsequently, a condensed DOM tree may be generated by removing qualifying nodes and leaves from a full DOM tree that represents extraneous aspects of the DOM tree that are likely to help the comparison. In another embodiment, sub-trees, other than the sub-tree corresponding to the selected section, that have not changed in the updated DOM tree are deleted from the updated DOM tree. The remaining sub-trees in the updated DOM tree may be compared with the sub-tree corresponding to the selected section.

Accordingly, in one embodiment, one or more computer-readable media having computer-executable instructions embodied thereon for performing a method of identifying a designated portion of a web page after the web page has been updated are provided. The method includes receiving, at a computing device, a selection of a first subsection of the web page. The method also includes retrieving and storing, at the computing device, a first version of the web page. The method further includes, after a threshold time period, retrieving, from a server hosting the web page, a second version of the web page. The method also includes generating, at the computing device, a first condensed document-object-model ("DOM") tree based on the first version of the web page by removing qualifying nodes from a full DOM tree based on the first version of the web page. The qualifying nodes have comparatively less value for mapping a portion of a first DOM tree to a portion of a second DOM tree. The method also includes generating, at the computing device, a second condensed DOM tree based on the second version of the web page by removing qualifying nodes from a full version DOM tree based on the second version of the web page. The method further includes identifying, at the computing device, a second subsection within the second version of the web page that corresponds to the first subsection using the first condensed DOM tree and the second condensed DOM tree.

In another embodiment, a method of mapping sections of a web page between different versions of the web page provided. The method includes receiving, at a computing device, a selection of a first subsection of the web page. The method also includes retrieving, from a web server hosting the web page, a first version of the web page at a first point in time. The method further includes identifying, at the computing device, a first sub-tree of a first document object model ("DOM") tree that corresponds to the first subsection of the web page in the first version of the web page. The method also includes retrieving, from the web server hosting the web page, a second version of the web page at a second point in time that is after the first point in time. The first version of the web page and the second version of the web page are different. The method also includes calculating a node distance metric between the first sub-tree in the first DOM tree and one or more sub-trees within a second DOM tree generated from the second version of the web page. The node distance metric increases as an amount of differences between sub-trees increases. The method also includes determining, at the computing device, that a particular sub-tree in the second DOM tree is a best match to the first sub-tree because the particular sub-tree is associated with a lowest node distance metric, thereby determining that a subsection of the second version of the web page, which corresponds to the particular sub-tree, corresponds to the first subsection of the first version of the web page.

In yet another embodiment, one or more computer-readable media having computer-executable instructions embodied thereon for performing a method of identifying a selected section of a web page after the web page has been updated. The method includes receiving, at a computing device, a selection of a first subsection of the web page, retrieving, and storing a first version of the web page. The method includes, after a threshold time period, retrieving, from a server hosting the web page, a second version of the web page. The method also includes generating, at the computing device, a first condensed document-object-model ("DOM") tree based on the first version of the web page by removing qualifying nodes from a full DOM tree based on the first version of the web page. The qualifying nodes have comparatively less value for mapping a portion of a first DOM tree to a portion of a second DOM tree. The method also includes generating, at the computing device, a second condensed DOM tree based on the second version of the web page by removing qualifying nodes from a full version of a DOM tree based on the second version of the web page. The method further includes calculating a node distance metric between each sub-tree within the first portion of the first condensed DOM tree and each sub-tree within the second condensed DOM tree. The node distance metric increases as an amount of differences between sub-trees increases. The method also includes identifying, at the computing device, a second subsection within the second version of the web page that corresponds to the first subsection using the node distance metric.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120*t*. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-readable media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Figure 2:
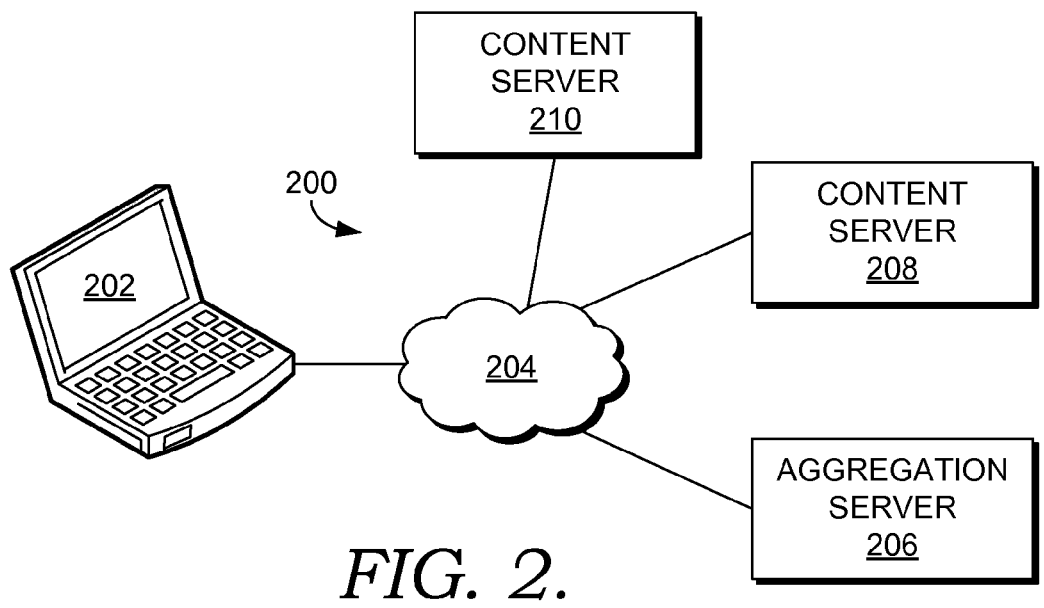
FIG. 2 is a block diagram of an illustrative operating environment suitable for implementing embodiments of the invention.

Turning now to FIG. 2, an illustrative operating environment 200 that contains a few of the components that may be used with embodiments of the present invention is shown. The components shown in FIG. 2 are just some of the components that embodiments of the invention may interact with during operation. The components shown in FIG. 2 are described in brief, and with an emphasis on function for the sake of simplicity. The components within FIG. 2 are communicatively coupled to each other in a manner appropriate for carrying out their respective functions within the illustrative operating environment 200. Embodiments of the present invention are not limited by the communication protocols or formats used to facilitate communication between components; those mentioned are for the sake of enablement and not meant to be limiting.

Illustrative operating environment 200 includes a client device 202, a network 204, an aggregation server 206, a first content server 208, and a second content server 210. Illustrative operating environment 200 is merely an example of one suitable environment and is not intended to suggest any limitation as to the scope of use or functionality of the present invention. Neither should illustrative operating environment 200 be interpreted as having any dependency or requirement related to any single component or combination of components illustrated therein. For example, the present invention could be practiced in an environment that includes a wireless network (not shown) that connects one or more devices, such as PDA's.

Client device 202 may be similar to the computing device 100 described with reference to FIG. 1. The client device 202 may run one or more applications that may access content over the Internet. The client device 202 may include a display device that is suitable for viewing media content such as movies, videos, video calls, pictures, web pages, or television shows. An LCD screen is one example of a display device that might work with the client device 202.

The client device 202 may take on any of a variety of forms. By way of example, the client device 202 may be a mobile telephone, smart phone, pager, computing device, laptop computer, desktop computer, personal digital assistant ("PDA") or any combination of these or other devices. The client device 202 has the ability to present one or more forms of media content. Examples of media content that could be displayed include, TV shows, movies, videos, MP3 files, web pages, and radio programs. This list is not exhaustive. The media may be presented as it is received over the network 204 or from memory within the client device 202. The client device 202 may also be capable of receiving one or more forms of communication. Examples of communications that may be received include phone calls, video calls, text messages, multimedia messages, emails, calendar updates, and task reminders. The client device 202 may be capable of running an aggregation application (not shown) that collects content from one or more websites, updated the content, and displays the content to the user in an aggregated site. Thus, though described as an aggregated site, the "site" could be generated locally on a device operated by a user. The aggregated site does not need to be hosted on a server apart from a user device. When embodiments of the present invention are practiced entirely on the client device 202, the aggregation server 206 is not required.

The network 204 is a wide area network ("WAN") and may include one or more mobile networks, one or more packet based networks, including the Internet, and the public switched telephone network ("PSTN"). The various components within the network 204 may be owned and/or operated by multiple entities, commercial or otherwise. The network 204 is configured to transmit a variety of communication formats including phone calls, emails, text messaging, faxes, web pages, instant messaging, pages, voice mails, photographs, audio files, movies, TV shows, calendar reminders, task reminders and other files containing communicative content.

The aggregation server 206 computing device maybe similar to the computing device 100. The aggregation server 206 may include a CPU, short-term memory, long-term memory and one or more network interfaces. A network interface is used to connect to a LAN, WAN (including the Internet), or other variety of communication network. The network interface to the WAN or LAN could be wired, wireless, or both. In one embodiment, the aggregation server 206 displays content retrieved from other web pages. The content displayed may have been previously selected by a user. In one embodiment, the aggregation server 206 may display different web pages to different users. The content displayed may be selected by the individual user to whom it is displayed. In one embodiment, the user navigates to a web page, selects a subsection of the web page, and indicates that the selected content should be added to the user's aggregation page. The user may repeat this process for different portions of a single web page or for different portions of multiple web pages. The aggregation server 206 periodically retrieves updated content corresponding to the selected content from the web page. The updated content is displayed to the user. Embodiments of the present invention are not limited to performance by an aggregation server 206. As described previously, an embodiment of the present invention may be performed by a client application on a user's client device.

The content server 208 and the content server 210 are computing devices that may be similar to the computing device 100. Both content servers 208 and 210 host one or more web sites that may be access by client device 202 and/or aggregation server 206. Each web site may include one or more web pages. The web pages may be written using combinations of computer languages including, but not limited to HTML and XTML. The content servers 208 and 210 may provide an access and authentication function in response to requests to access web sites hosted by the content servers 208 and 210. While depicted as a single server, content servers 208 and 210 may be a server cluster or a distributed computing environment, including various proxy servers, working together to host one or more web sites.

Figure 3:
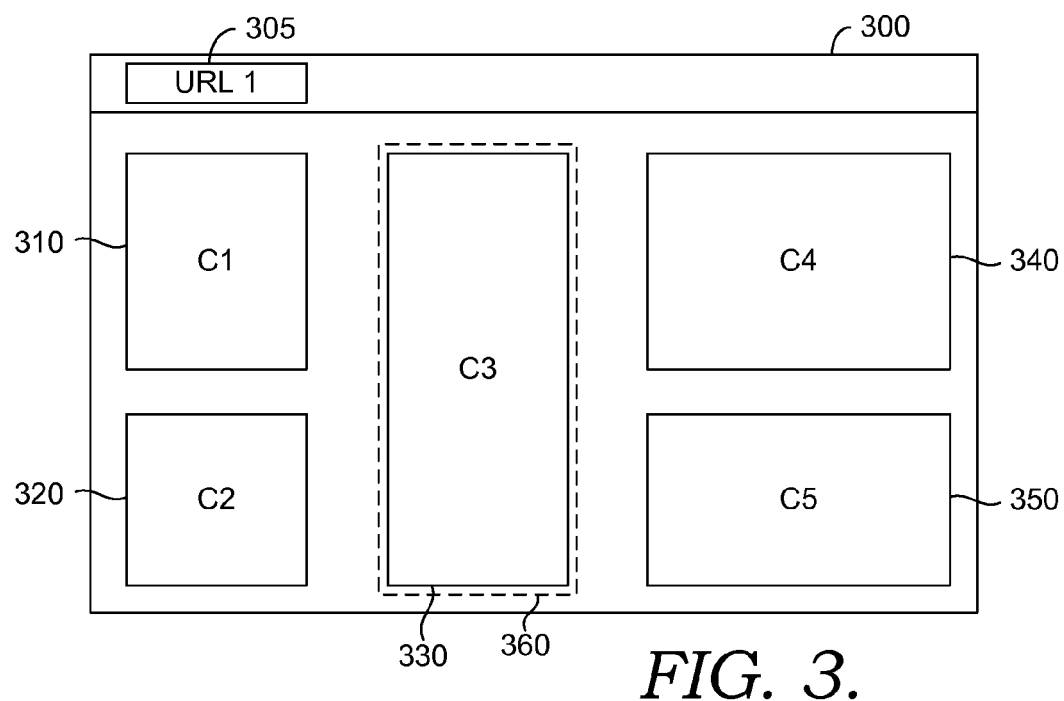
FIG. 3 is a diagram of a user interface displaying a first web site that has multiple subsections, in accordance with an embodiment of the present invention.
Figure 4:
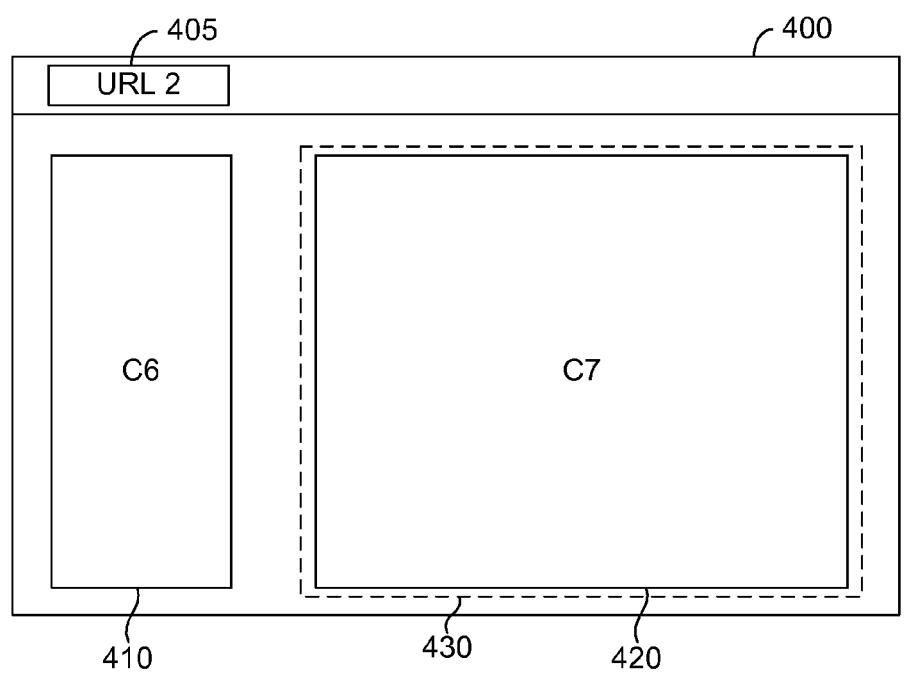
FIG. 4 is a diagram of a user interface displaying a second web site that has multiple subsections, in accordance with an embodiment of the present invention.
Figure 5:
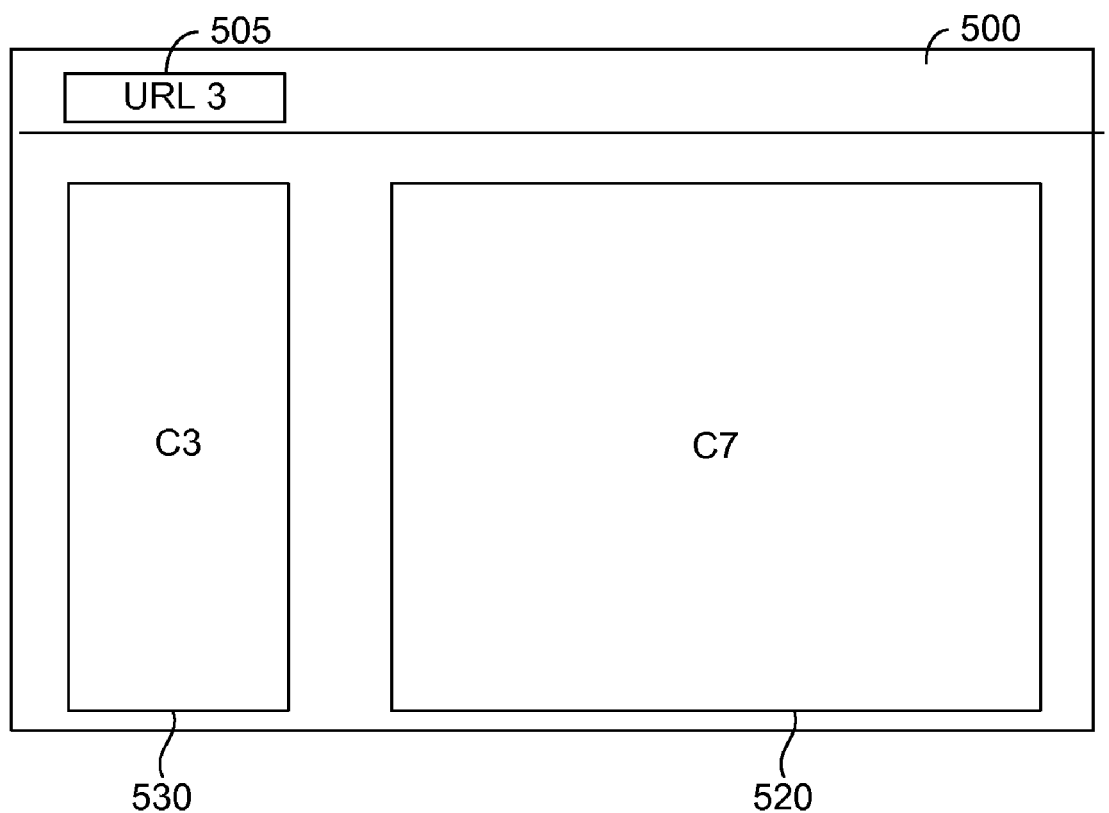
FIG. 5 is a diagram of a user interface displaying a aggregation site that shows content from the first and second web sites, in accordance with an embodiment of the present invention.

At a high level, embodiments of the present invention allow a user to select subsections of multiple web pages for inclusion in a site that aggregates the subsections, updates the subsections, and displays the updated subsections in a single user interface (sometimes referred to as an aggregated website). Lower level details include the method used to determine which section of an updated webpage corresponds to the selected subsection in the original webpage. The selection and aggregation of content is illustrated in FIGS. 3, 4, and 5. The subsequent figures describe the lower level details involved with matching the selected subsection to a corresponding subsection in the updated web page.

Turning now to FIG. 3, a user interface 300 displaying a first web site having multiple subsections is shown. The user interface 300 includes a navigation bar 305 that indicates the content being displayed on user interface 300 originates from URL 1. The various blocks shown on user interface 300 represent content on a web page reached at URL 1. The subsection 310 includes content C1. The subsection 320 includes content C2. The subsection 330 includes content C3. The subsection 340 includes content C4, and the subsection 350 includes content C5. The various contents may be an article, an advertisement, picture, video, search results, a blog, or any other type of content found on a web page. The dash line 360 indicates that the user has selected the subsection 330, which includes content C3. The user may select subsection 330 by highlighting the subsection 330 with a pointing device, such as a mouse, and giving an indication that the subsection 330 should be added to an aggregation site. In one embodiment, the indication may be provided by selecting a button on a toolbar provided by the aggregation site. Though referred to as an aggregation site, embodiments of the present invention contemplate that the aggregation site could be a user interface generated by an application running on the user's client device. In another embodiment, the user may provide the indication by selecting the content and selecting a menu item that comes up after clicking a button on a mouse.

Turning now to FIG. 4, a user interface 400 displaying a second web page having multiple subsections is shown. Like FIG. 3 the user interface 400 may be similar to a user interface generated by a web browser. The navigation bar 405 indicates that the source of the content on user interface 400 is URL 2. The content includes content C6 in subsection 410 and content C7 in subsection 420. The dashed box 430 indicates that subsection 420 has been selected for inclusion in an aggregation site.

Turning now to FIG. 5, an aggregation site is displayed in user interface 500 in accordance with the embodiment of the present invention. The navigation bar 505 indicates that the source of the content is URL 3. User interface 500 may be similar to a user interface generated by a web browser. The user interface 500 includes content C3 in content block 530 and content C7 in content block 520. Content C3 originated from URL 1 while content C7 originated from URL 2. The content is depicted in new content blocks because the arrangement or appearance may change based on the user's preference when it is retrieved from the source. Thus, user interface 500 displays content that is retrieved from two different sources. FIG. 5 illustrates an embodiment using a web based aggregation application that is displayed through a web site. However, as explained previously, embodiments of the invention are not limited to a web based approach. The user interface could be generated locally, in which case, it may not utilize a web browser to generate the user interface.

Figures 6, 7:
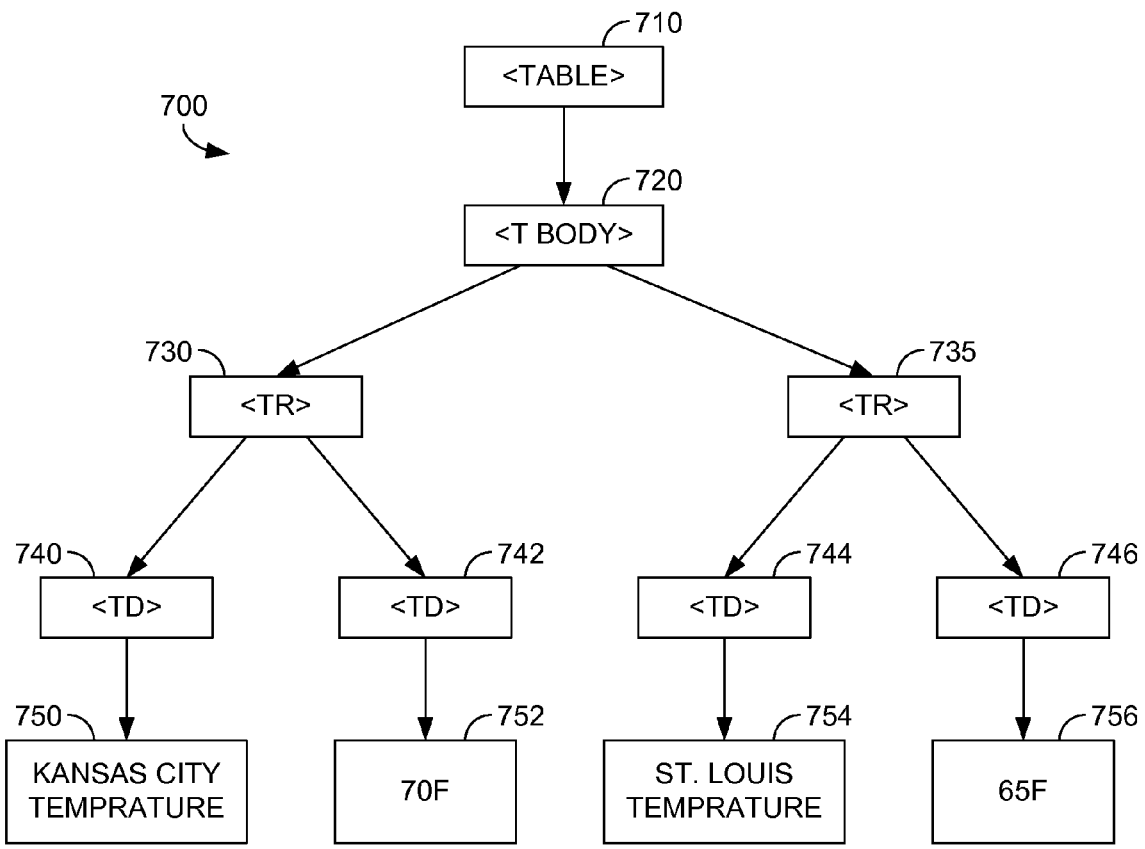
FIG. 6 is a diagram showing an illustrative table for illustrating a DOM tree, in accordance with an embodiment of the present invention.
FIG. 7 is a diagram showing a DOM tree generated based on the HTML code required to render a table, in accordance with an embodiment of the present invention.

As explained in more detail subsequently, the application generating the user interface 500 may periodically retrieve updates from the sources to depict new content in content block 530 and content block 520. In order to determine which part of the web page from URL 1 depicted in user interface 300 corresponds to subsection 330 the document object model ("DOM") of the different web page versions is compared. FIGS. 6 & 7 illustrate a DOM tree that may be compared within embodiments of the present invention. These FIGS. illustrate simple DOM trees but do not yet describe the comparisons made between DOM trees.

Turning now to FIG. 6, a illustrative table 600 for the sake of illustrating a DOM tree is shown. This table may be generated using basic HTML. The table indicates that the temperature in Kansas City is 70 degrees F. and the temperature in St. Louis is 65 degrees F.

FIG. 7 illustrates a DOM tree generated based on the HTML code required to render table 600. Throughout the description of embodiments of the present invention, nodes in a DOM tree have at least one child, while leaves have no children. Thus, leaves are at the bottom of a DOM tree. The DOM tree 700 includes node 710, which corresponds to the instructions to create a table. Node 720 introduces the body of the table. Nodes 730 and 735 introduce a new row in the table. Nodes 740, 742, 744, 746 each indicate a table data cell. The leaf 750 includes text "Kansas City temperature" that goes into the first cell in the table corresponding to node 740. The leaf 752 includes the text "70 F." The leaf 754 includes the text "St. Louis temperature." The leaf 756 includes the text "65 F."

Figure 8:
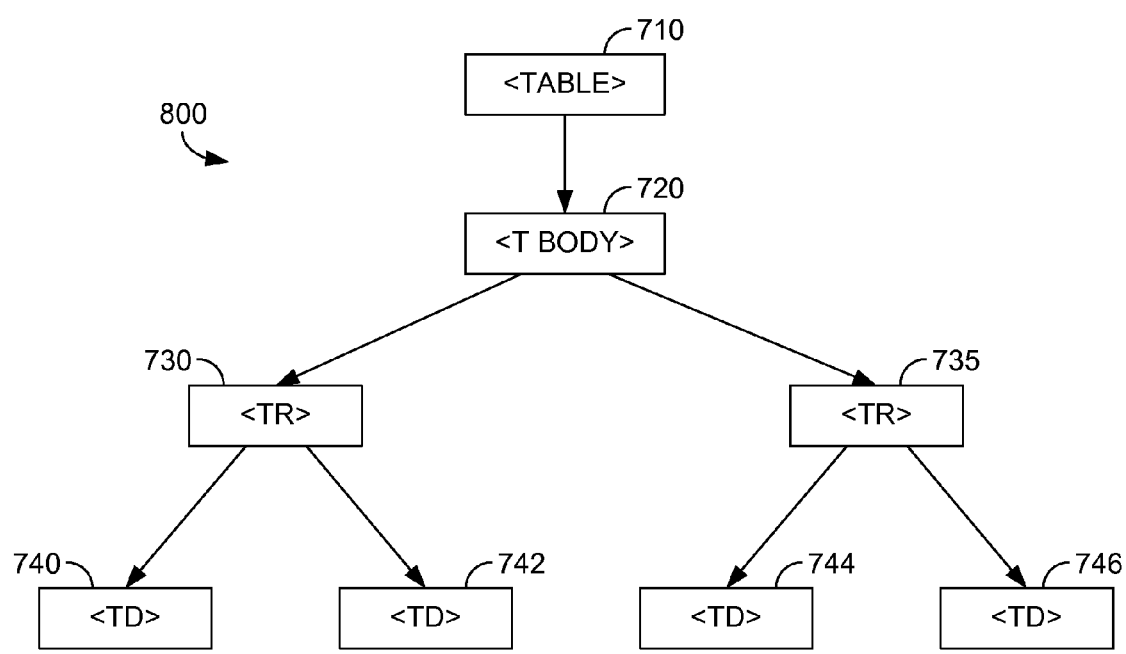
FIG. 8 is a diagram showing a condensed DOM tree generated based on a full DOM tree, in accordance to the embodiment of the present invention, in accordance with an embodiment of the present invention.

Turning now to FIG. 8, a diagram of a condensed DOM tree 800 based on full DOM tree 700 is shown, in accordance with the embodiment of the present invention. As described previously, prior to comparing DOM trees from different versions of a web page, a condensed DOM tree may be generated to simplify the comparison. In one embodiment, textual leaves are removed from the full DOM tree to generate the condensed DOM tree. The condensed DOM tree 800, depicted in FIG. 8, is identical to the full DOM tree 700 depicted in FIG. 7 except for the textual leaves that are removed from their parent nodes. Removing textual nodes is one rule that may be followed to generate a condensed DOM tree. As explained in more detail, several different rules may be applied to remove nodes from a full DOM tree to generate a condensed DOM tree.

Figure 9:
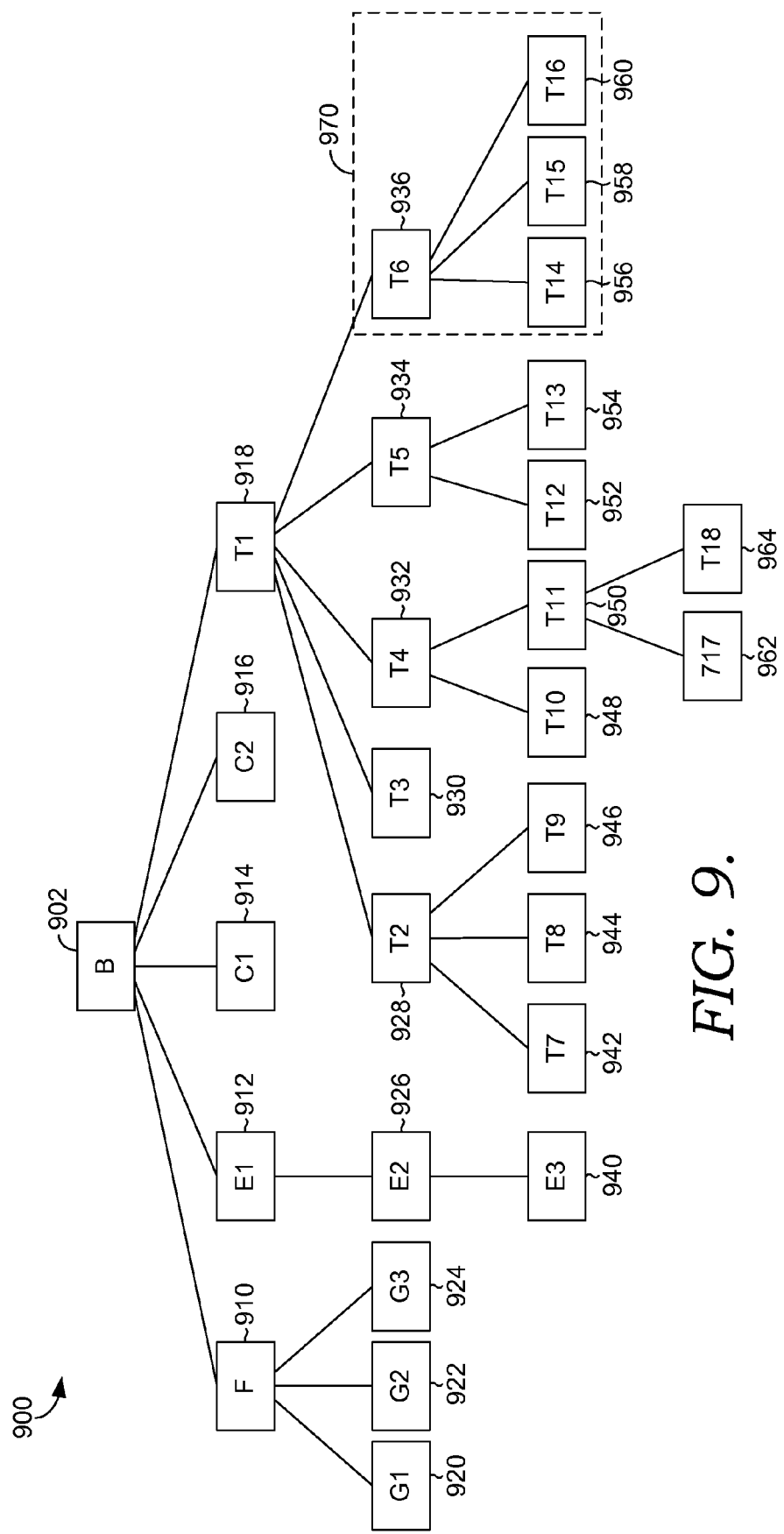
FIG. 9 is a diagram showing a condensed document object model ("DOM") tree generated from an original version of a web page, in accordance with an embodiment of the present invention, in accordance with an embodiment of the present invention.

FIGS. 9-12 illustrate identifying a sub-tree in an updated DOM tree that is most similar to a sub-tree in the original DOM that corresponds to a selection subsection. Turning now to FIG. 9, a document object model ("DOM") tree 900 generated from a first version of a web page is shown, in accordance with an embodiment of the present invention. The first version of the web page is the version at the time a selection of a subsection is made for inclusion in the aggregated site. The first version may also be referred to as the original version. A DOM tree may be generated by calling a routine within a web browser. In one embodiment, a condensed version of the DOM tree 900 is generated prior to comparing sub-nodes. A condensed DOM tree may be generated by removing qualifying nodes from the DOM tree 900.

The DOM tree 900 includes a series of nodes and leaves. As described previously, a node contains at least one child while a leaf has no children. As illustrated in FIG. 9, a DOM tree is a hierarchical organization based on the code used to render a web page. The letters such as "b" or "f" represent the description or content of the node. The content may be an HTML or an XML tag. The letters shown in the nodes and leaves of DOM tree 900 are not intended to correlate to any specific tags or content of an actual language used to generate web pages. The letters within the different nodes and leaves are simply for the sake of illustration and to demonstrate that the content of the nodes and leaves are different. The DOM tree 900 includes nodes 902, 910, 912, 918, 926, 928, 932, 934, 936, and 950. The DOM tree 900 also includes leaves 914, 916, 920, 922, 924, 930, 940, 942, 944, 946, 948, 952, 954, 956, 958, 960, 962 and 964. The sub-tree 970 corresponds to the subsection of the web page selected by a user for inclusion in an aggregation site or application. The sub-tree 970 includes node 936 and leaves 956, 958, and 960. Upon receiving the selection of a subsection of a web page, the DOM tree corresponding to the web page is downloaded and stored. The sub-tree corresponding to the portion selected is identified for subsequent analysis.

Figure 10:
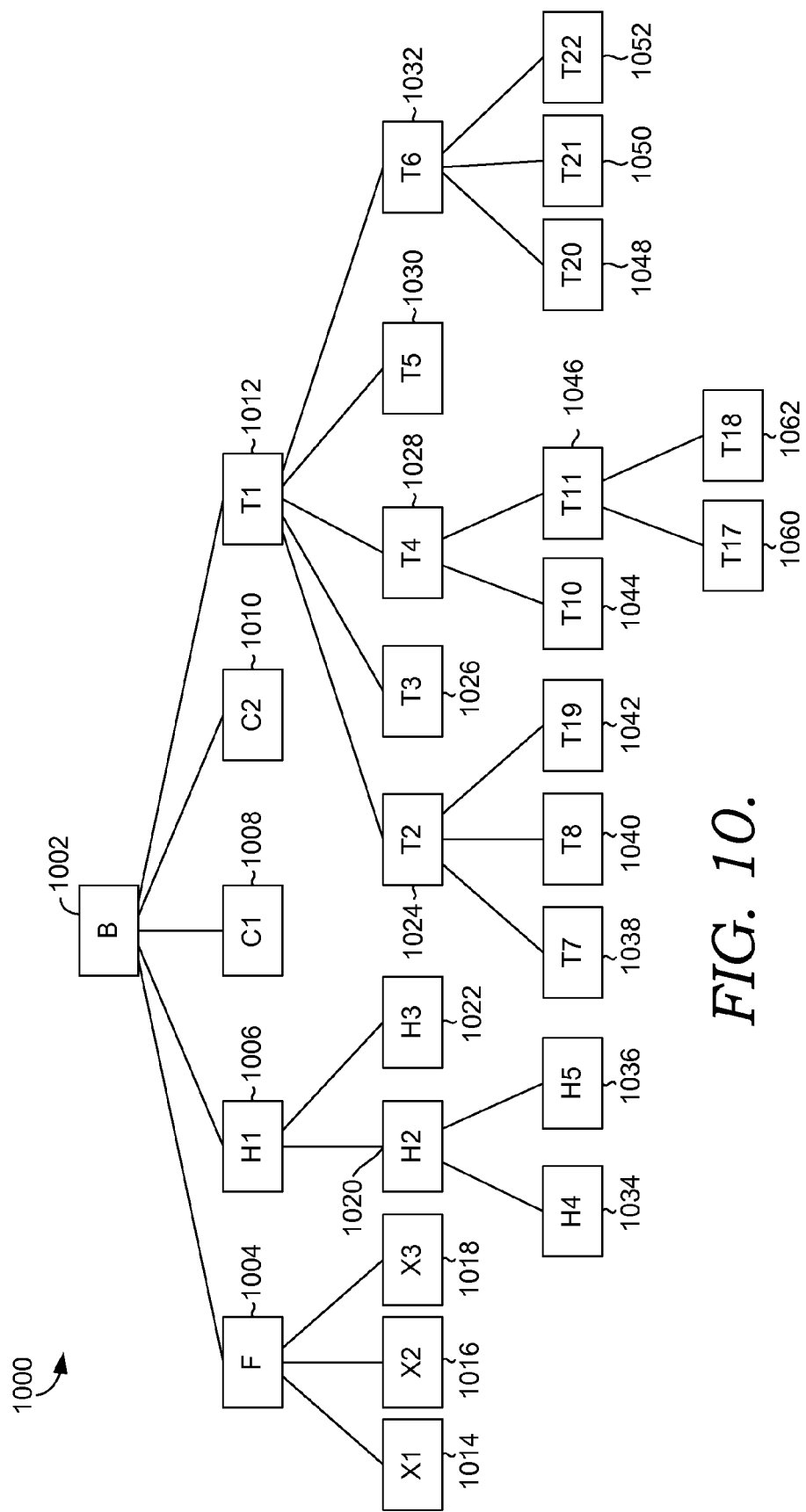
FIG. 10 is a diagram showing diagram showing a condensed document object model ("DOM") tree generated from an updated version of a web page, in accordance with an embodiment of the present invention.

Turning now to FIG. 10, an updated DOM tree 1000 based on an updated version of the web page is shown, in accordance with an embodiment of the present invention. The updated web page is an updated version of the web page used to generate the DOM tree 900 described previously with reference to FIG. 9. As described previously, once a subsection is selected, an aggregation application will periodically retrieve an updated version of the source web page to determine if the selected portion of the web page has been updated. If the web page has been updated, the selected subsection needs to be identified in the updated web site and displayed. The identification process involves a comparison of the DOM trees from the respective web page versions. As described previously, the actual comparison may be made between condensed versions of the DOM tree rather than full versions of the DOM tree. However, the generation of a condensed DOM tree is not explicitly depicted in FIGS. 9-11. Updated DOM tree 1000 includes nodes 1002, 1004, 1006, 1012, 1020, 1024, 1028, 1032, and 1046. The updated DOM tree 1000 includes leaves 1008, 1010, 1014, 1016, 1018, 1022, 1026, 1030, 1034, 1036, 1038, 1040, 1042, 1044, 1048, 1050, 1052, 1060, and 1062.

In order to determine which portion of the updated DOM tree 1000 corresponds with sub-tree 970, the various sub-trees on updated DOM tree 1000 are compared with sub-tree 970. Prior to making this comparison, a portion of portions of updated DOM tree 1000 that are identical to DOM tree 900 are removed from consideration. Removing the identical sub-trees forms a condensed DOM tree. In one embodiment, sub-tree 970 is not part of this search for identical sub-trees. Removing a sub-tree identical to sub-tree 970 from the updated DOM tree 1000 could defeat the purpose of the comparison, which is to identify the portion of updated DOM tree 1000 that corresponds with sub-tree 970.

Figure 11:
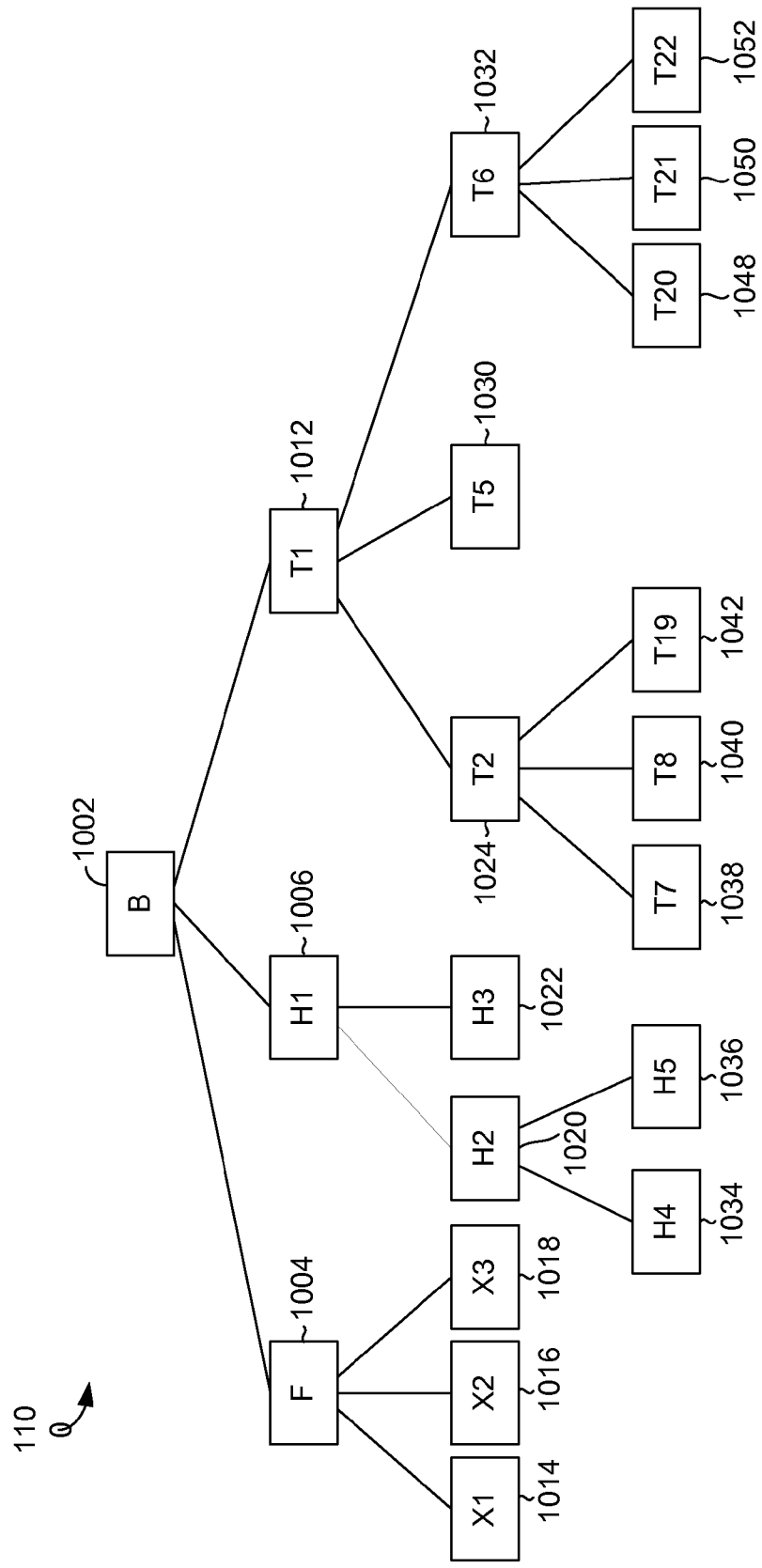
FIG. 11 is a diagram showing a trimmed DOM tree that has been modified to remove identical sub-trees, in accordance with an embodiment of the present invention.

Turning now to FIG. 11, a trimmed DOM tree 1100 that has been modified to remove identical sub-trees is shown, in accordance with an embodiment of the present invention. The trimmed DOM tree 1100 is based on the updated DOM tree 1000 depicted in FIG. 10. For the sake of simplicity, the trimmed DOM tree 1100 is generated by removing sub-trees within the updated DOM tree 1000 that are identical to sub-trees within the DOM tree 900. In one embodiment, identical sub-trees are simply designated as identical and excluded from the comparison rather than actually removed. The trimmed DOM tree 1100 includes each of the nodes and leaves from updated DOM tree 1000 unless the nodes or leaves are within a sub-tree that was identical to a sub-tree in DOM tree 900. For example, leaf 914 and leaf 916 have been removed because they are identical in both DOM trees. Similarly leaf 1026 has also been removed. Additional modifications to the updated DOM tree 1000 could be made to generate a condensed version of updated DOM tree 1000. Trimming identical sub-trees may also be considered part of the process of generating a condensed DOM tree. Thus, a trimmed DOM tree may be one form of a condensed DOM tree. The additional modifications (not shown) include removing qualifying nodes and leaves from a full DOM tree. Qualifying nodes may include text nodes, nodes that are below a threshold width or height, nodes that have a single child as well as certain nodes corresponding to designated HTML or XML commands. For example, nodes <COL>, <COL group>, <map>, and <area>, could be removed in an embodiment of the present invention. Other nodes may be retained even if they otherwise satisfy one or more of the previous criteria. For example the <body> node should not be removed.

Figure 12:
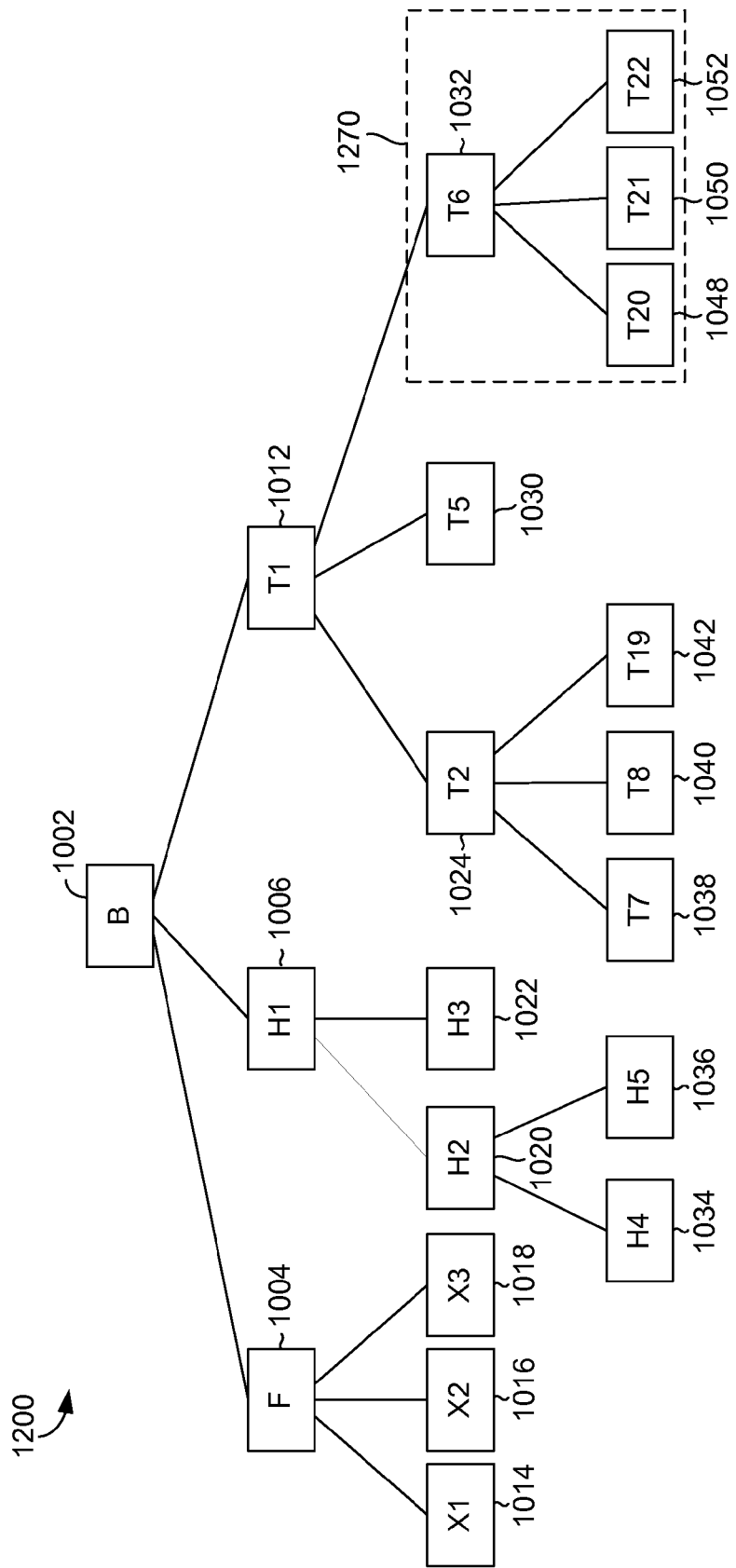
FIG. 12 is a diagram showing a sub-tree that is most similar to the target sub-tree, in accordance with an embodiment of the present invention.

Turning now to FIG. 12, the sub-tree that is most similar to the target sub-tree is shown, in accordance with an embodiment of the present invention. Once the trimmed DOM tree 1100 is generated, the sub-trees in the trimmed DOM tree 1100 may be compared against the sub-tree 970 to find the most similar sub-tree. In this case, sub-tree 1270 has been identified as the most similar sub-tree through a process to be explained in more detail subsequently. Sub-tree 1270 includes node 1032 and leaves 1048, 1050, and 1052. Having identified the sub-tree that most closely resembles the sub-tree 970, the subsection of the updated web page that corresponds to the sub-tree 1270 may be displayed on an aggregate station site.

Figure 13:
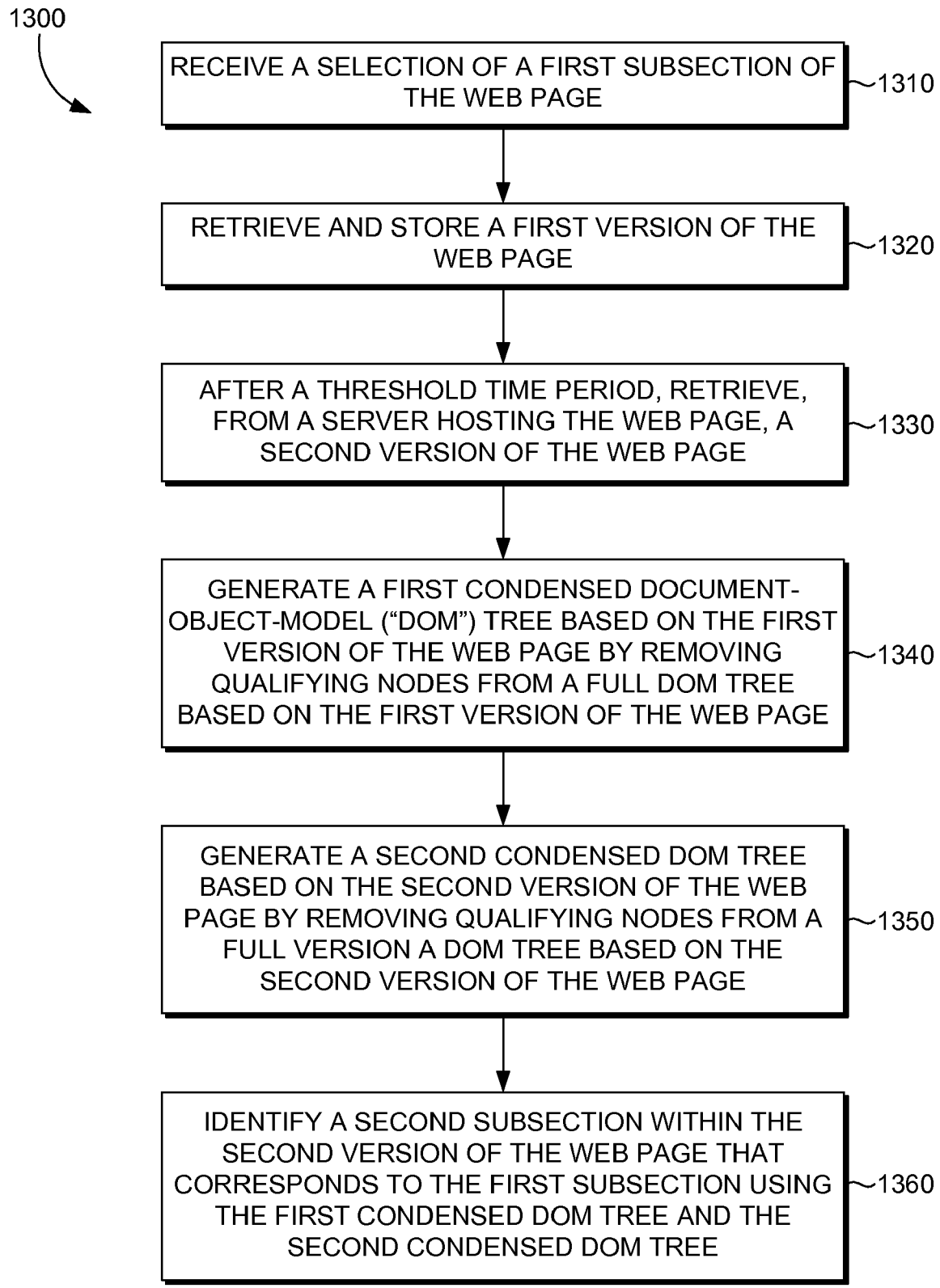
FIG. 13 is a flow chart showing a method of identifying a designated portion of a web page after the web page has been updated, in accordance with the embodiment of the present invention.

Turning now to FIG. 13, a flow chart showing a method 1300 of identifying a designated portion of a web page after the web page has been updated, in accordance with the embodiment of the present invention. At step 1310, a selection of a first subsection of the web page is received at a computing device. As described previously, the computing device could be an aggregation server similar to aggregation server 206 described previously with reference to FIG. 2. In this embodiment, the aggregation server may allow users to select content from various websites, automatically retrieve updated versions of the content, and display the content to users. In another embodiment, the computing device is a client device, such as a laptop computer that has an application for generating a user interface that displays content selected from multiple source web pages. In a further embodiment, the computing device is a proxy server that generates a user specific interface based on content selected from two or more source websites. As described previously, the selection may be made by highlighting content in a web page and providing an indication, through a button or other method, that the selected content should be added to the user's aggregated site. In one embodiment, the first subsection is less than the entire web page. The first subsection may be a single picture, a headline, story, blog entry, blog summary, or other portion of a web page.

At step 1320, a first version of the web page is retrieved and stored. The first version of the web page may be retrieved and stored contemporaneously with the selection of the first subsection of the web page. The web page may be stored in one or more computer-storage media. The storage of the first version need not include content linked through X-REFs or other linked content. In one embodiment, a DOM tree of the first version of the web page is generated and stored. As described previously, the DOM tree may be generated by an application part of commonly available web browsers. The portion of the DOM tree that corresponds to the first subsection of the web page is noted for future evaluation and referred to as the first sub-tree thought this description.

At step 1330, after a threshold period of time, a second version of the web page is retrieved. The web page may be retrieved from a server hosting the web page. The threshold period of time may vary based on user preference or a computer learning algorithm that determines how frequently a particular web page is updated over time. In general, the threshold period of time may roughly correspond with the frequency of updates to the web page. In one embodiment, the second version of the web page is evaluated to determine if it is different than the first version of the web page. If the first and second version of the web page are the same, then no further action may be needed. However, if the second version and the first version of the web page are different, then subsequent steps in the method are required to determine which portion of the second version of the web page corresponds with the first subsection of the web page that was selected in the first version.

At step 1340, a first condensed DOM tree is generated based on the first version of the web page. As explained previously, the condensed DOM tree may be generated by removing qualified nodes from the full DOM tree that is generated from the first version of the web page. As indicated previously, the full version of the DOM tree may have been generated at the time the first version of the web page was retrieved from the web server. Various criteria may be used to define qualifying nodes, but in general qualifying nodes have comparatively less value for mapping a portion of a first DOM tree to a portion of a second DOM tree. Thus, the condensed DOM tree will only contain those nodes most likely to identify the sub-trees in the updated DOM tree that correspond to the sub-trees within the first version of the DOM tree that had been previously noted as corresponding to the first subsection. A qualifying node may be a text node, a node that is below a threshold size, or a node that has a single child node. In one embodiment, if the node has a single child node, then the node is deleted and the single child node is linked to a parent node of the deleted node. In one embodiment, a body node is never a qualifying node even if it satisfies one or more criteria that would otherwise make it a qualifying node. Other node types may also be designated exception to the rules defining qualifying nodes.

At step 1350, a second condensed DOM tree based on the second version of the web page is generated by removing qualifying nodes from a full version of a DOM tree that is based on a second version of the web page. The process of generating a condensed DOM tree has been described previously.

At step 1360, a second subsection within the second version of the web page that corresponds to the first subsection is identified using the first condensed DOM tree and the second condensed DOM tree. The subsection in the second version of the web page may be identified by determining which sub-tree within the second condensed DOM tree corresponds to the sub-tree in the first DOM tree that corresponds to the first subsection of the web page (i.e., the first sub-tree). The first sub-tree may be compared with each sub-tree within the second condensed DOM tree to determine the best match. The best match may be determined by calculating a node distance metric between the first sub-tree and each sub-tree in the second condensed DOM tree. The node distance metric increases when differences between sub-trees increase. For example when nodes are added, deleted, or relabeled a difference is noted and the node distance metric increases. The sub-tree in the second condensed DOM tree with the lowest node distance metric between the sub-tree and the first condensed DOM tree may be designated as the sub-tree that corresponds to the sub-tree in the first condensed DOM tree.

Figure 14:
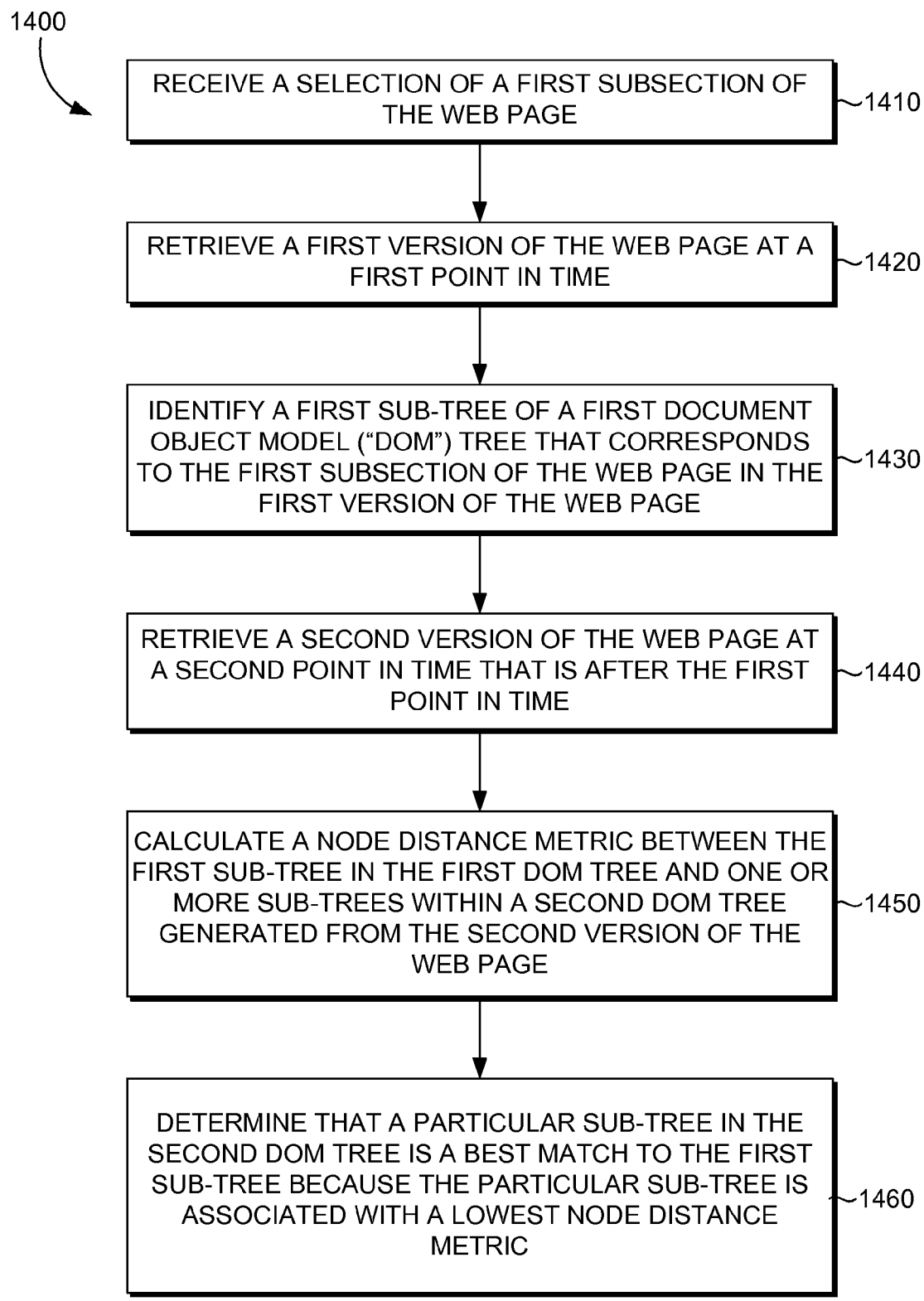
FIG. 14 is a flow chart showing a method of mapping sections of the web page between different versions of the web page, in accordance with an embodiment of the present invention.

Turning now to FIG. 14, a flow chart showing a method 1400 of mapping sections of the web page between different versions of the web page is shown, in accordance with an embodiment of the present invention. At step 1410, a selection of a first subsection of the web page is received. As explained previously, the first subsection may be selected by a user by highlighting the subsection on the web page and providing an indication, through a button or other input method, that the user wishes to add the highlighted field to an aggregation interface. As explained previously, the aggregation application may retrieve content from multiple web pages and display the content on a single user interface. The aggregation application will periodically retrieve updated versions of the source web pages and display the updated sections that correspond to the selected subsection of the web page.

At step 1420, a first version of the web page is retrieved at a first point in time. In one embodiment, the first point in time is contemporaneous with receiving the selection. The first version of the web page may be stored in one or more computer-readable media.

At step 1430, a first sub-tree that corresponds to the first subsection of the web page is identified within a first document object model ("DOM") tree. When rendered, the first sub-tree displays the first subsection of the web page.

At step 1440, a second version of the web page is retrieved at a second point in time that is after the first point in time. The first version of the web page and the second version of the web page are different. In one embodiment, the first and second point in time may be chosen by a user.

At step 1450, a node distance metric between the first sub-tree, from the first DOM tree, and one or more sub-trees within the second DOM tree are calculated. The second DOM tree is generated from the second version of the web page. The node distance metric increases as an amount of differences between sub-trees increase. The node distance metric may be calculated using a combination of algorithms. The combination of algorithms, including one or more parallel equations, essentially measures the number edit operations required to transform one tree to another. Edit operations include the addition of nodes, the subtraction of nodes, and changes to nodes that were not added or subtracted. In one embodiment, Zhang and Shasha's Algorithm with a time complexity of $O(|T_1||T_2|\min(L_1,D_1)\min(L_2,D_2))$ and space complexity of $O(|T_1||T_2|)$ is used to calculate the distance metric, where $|T|$ is the number of nodes in the sub-tree, $|L|$ is the number of leaves in the sub-tree and $|D|$ is the maximum depth of the sub-tree. The cost function of each edit operation is defined as following: Delete(u)=Insert(u)=u.NetArea; Update(u, v)=|u.NetArea-v.NetArea|; DeleteTree(u)=InsertTree(u)= u.Area. The property Area of a node u is the area of the node's bounding rectangle. While the property NetArea is the area of the node's bounding rectangle excluding the area of its children's bounding rectangles, which accurately reflects the node's displaying region that can be seen by a user. Furthermore, other properties of a node, such as the node's tag name can be taken into consideration during the calculation of the cost function. In one embodiment, the first DOM tree and the second DOM tree are condensed versions of full DOM trees. Generating a condensed version of a full DOM tree has been described previously with reference to FIG. 13. In addition, the second DOM tree may be further trimmed by removing sub-trees that are almost identical to sub-trees in the first DOM tree. This would not include sub-trees that are identical to the first sub-tree, since this would defeat the purpose of trying to identify the corresponding sub-tree. However, if a sub-tree is determined to be identical to the first sub-tree then the node distance metric would be zero and that sub-tree would be selected as the corresponding sub-tree. In one embodiment, a low cost tree edit distance algorithm with basic tree edit operations is used to perform this preprocessing, as the advanced tree edit operations such as insertion or deletion of arbitrary nodes and swapping of neighboring sub-trees may be unnecessary to identify the almost identical sub-trees. In our implementation, the Selkow's Algorithm with time and space complexity of $O(|T_1||T_2|)$ is used for the preprocessing.

At step 1460, a particular sub-tree in the second DOM tree is determined to be the best match to the first DOM tree because the particular sub-tree is associated with the lowest node distance metric. As described previously, the lowest node distance metric is calculated between the first sub-tree and each sub-tree within the second DOM tree. Once the particular sub-tree is identified, the portion of the web page that corresponds to the particular sub-tree may be determined to be the subsection of the second version of the web page which corresponds to the subsection in the first version of the web page. The second subsection may then be displayed to the user as part of the aggregation application.

Figure 15:
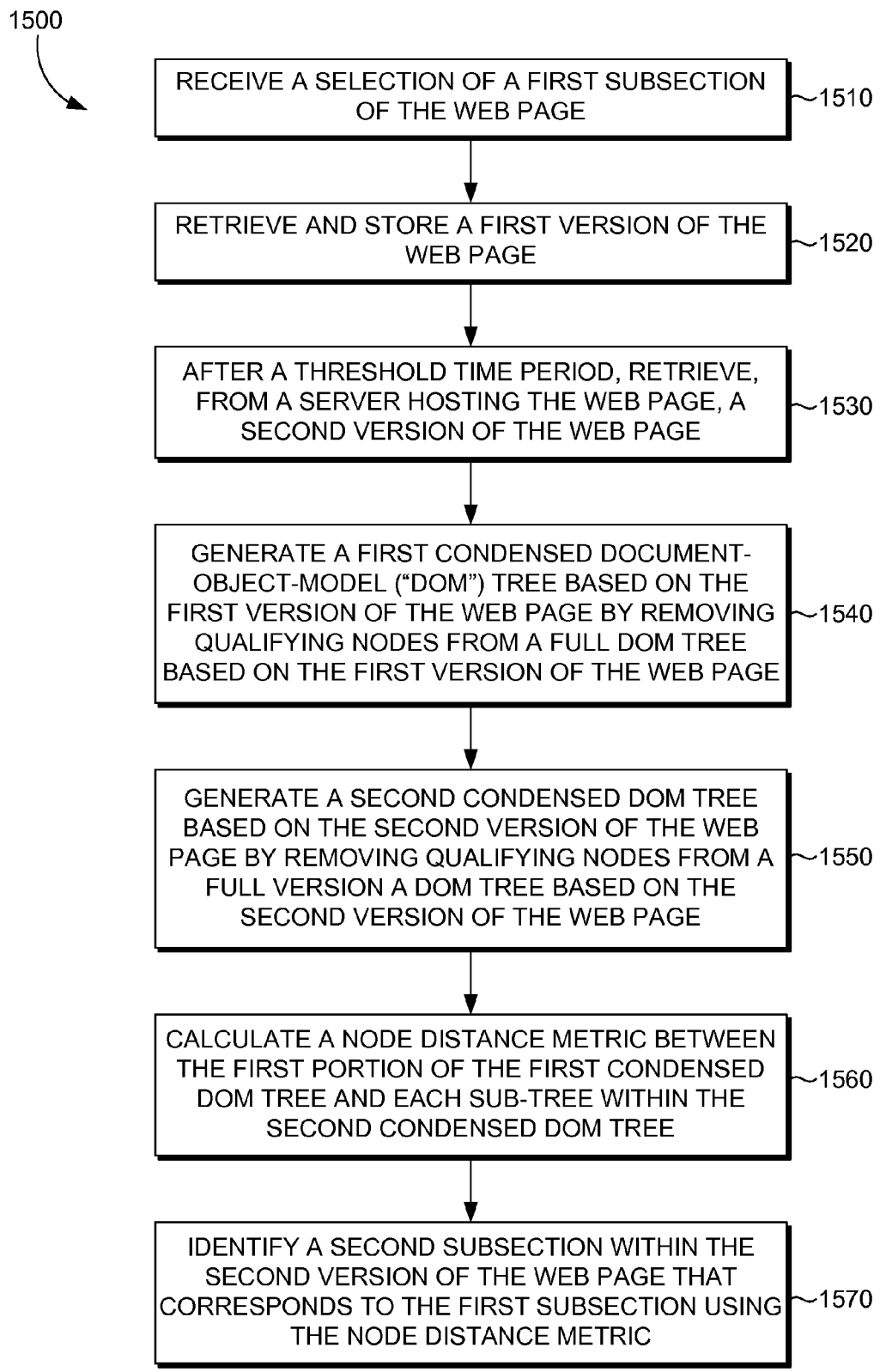
FIG. 15 is a flow chart showing a method of identifying a selected section of a web page after the web page has been updated, in accordance with an embodiment of the present invention.

Turning now to FIG. 15, is a flow chart showing a method 1500 of identifying a section of an updated web page that corresponds to a selected section of a previous version of the web page, in accordance with an embodiment of the present invention. At step 1510, a selection of a first subsection of the web page is received. The selection of a portion of a web page has been described previously. At step 1520, a first version of the web page is retrieved and stored. At step 1530, after a threshold period of time, a second version of the web page is retrieved from a server hosting the web page.

At step 1540, a first condensed document object model ("DOM") tree is generated based on the first version of the web page by removing qualified nodes from a full DOM tree based on the first version of the web page. The criteria for qualifying nodes have been described previously, but in general they have comparatively less value for mapping a portion of a first DOM tree to a portion of a second DOM tree. At step 1550, a second condensed DOM tree based on a second version of the web page is generated by removing qualified nodes from a full version of the DOM tree that is based on the second version of the web page.

At step 1560, a node distance metric between each sub-tree within the first portion of the first condensed DOM tree is calculated. At step 1570, a second subsection within the second version of the web page that corresponds to the first subsection is identified using the node distance metric.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-readable media having computer-executable instructions embodied thereon for performing a method of identifying a designated portion of a web page after the web page has been updated, the method comprising:
    receiving, at a computing device, a selection of a first subsection of the web page;
    retrieving and storing, at the computing device, a first version of the web page;
    after a threshold time period, retrieving, from a server hosting the web page, a second version of the web page;
    generating, at the computing device, a first condensed document-object-model ("DOM") tree based on the first version of the web page by removing qualifying nodes from a full DOM tree based on the first version of the web page;
    generating, at the computing device, a second condensed DOM tree based on the second version of the web page by removing qualifying nodes from a full version DOM tree based on the second version of the web page;
    comparing the first condensed DOM tree to the second condensed DOM tree with a low cost edit algorithm to identify one or more sub-trees that are identical in both the first condensed DOM tree and the second condensed DOM tree such that the one or more sub-trees that are identical are excluded from a node distance calculation of the first condensed DOM tree;
    calculating using a tree distance algorithm a node distance metric between each nonexcluded sub-tree within the first sub-tree of the first condensed DOM tree and one or more nonexcluded sub-trees within the second condensed DOM tree, wherein the node distance metric increases as an amount of differences between sub-trees increases;
    identifying, at the computing device, a second subsection within the second version of the web page that corresponds to the first subsection using the first condensed DOM tree and the second condensed DOM tree;
    updating an aggregate website, based on the second subsection within the second version of the web page that corresponds to the first subsection within the first version of the web page.

2. The media of claim 1, wherein the qualifying nodes include one or more of text nodes, and nodes that are below a threshold size.

3. The media of claim 2, wherein a body node is never a qualifying node.

4. The media of claim 1, wherein the second subsection corresponds to a sub-tree in the second condensed DOM tree with a lowest node distance metric.

5. The media of claim 1, further including displaying the second subsection on a user interface that does not display the rest of the web page.

6. A method of mapping sections of a web page between different versions of the web page, the method comprising:
    receiving, at a computing device, a selection of a first subsection of the web page; retrieving and storing, at the computing device, a first version of the web page;
    after a threshold time period, retrieving, from a server hosting the web page, a second version of the web page;
    generating, at the computing device, a first condensed document-object-model ("DOM") tree based on the first version of the web page by removing qualifying nodes from a full DOM tree based on the first version of the web page;

generating, at the computing device, a second condensed DOM tree based on the second version of the web page by removing qualifying nodes from a full version DOM tree based on the second version of the web page;

comparing the first condensed DOM tree to the second condensed DOM tree with a low cost edit algorithm to identify one or more sub-trees that are identical in both the first condensed DOM tree and the second condensed DOM tree such that the one or more sub-trees that are identical are excluded from a node distance calculation of the first condensed DOM tree;

calculating using a tree distance algorithm a node distance metric between each nonexcluded sub-tree within the first sub-tree of the first condensed DOM tree and one or more nonexcluded sub-trees within the second condensed DOM tree, wherein the node distance metric increases as an amount of differences between sub-trees increases;

identifying, at the computing device, a second subsection within the second version of the web page that corresponds to the first subsection using the first condensed DOM tree and the second condensed DOM tree;

updating an aggregate website, based on the second subsection within the second version of the web page that corresponds to the first subsection within the first version of the web page.

7. The method of claim 6, wherein the method further includes: prior to said determining, condensing the first DOM tree and the second DOM tree.

8. The method of claim 7, wherein the condensing includes:
   removing text nodes; and
   removing any node with only one child node and attaching the one child node directly to a removed node's parent node.

9. The method of claim 7, wherein the condensing includes removing nodes that are below a threshold width or a threshold height, thereby discounting minor differences between the first version of the web page and the second version of the web page.

10. The method of claim 6, wherein the differences include one or more of adding a new node to a sub-tree, deleting a node from a sub-tree, and editing a node in a sub-tree.

11. One or more computer-readable media having computer-executable instructions embodied thereon for performing a method of identifying a section of an updated web page that corresponds to a selected section of a previous version of the web page, the method comprising:
   receiving, at a computing device, a selection of a first subsection of the web page;
   retrieving and storing, at the computing device, a first version of the web page;
   after a threshold time period, retrieving, from a server hosting the web page, a second version of the web page;
   generating, at the computing device, a first condensed document-object-model ("DOM") tree based on the first version of the web page by removing qualifying nodes from a full DOM tree based on the first version of the web page;
   generating, at the computing device, a second condensed DOM tree based on the second version of the web page by removing qualifying nodes from a full DOM tree based on the second version of the web page;
   and mapping the first condensed DOM tree to the second condensed DOM tree with a low cost edit algorithm to identify one or more sub-trees that are identical in both the first condensed DOM tree and the second condensed DOM tree such that the one or more sub-trees that are identical are excluded from a node distance calculation of the first condensed DOM tree;
   excluding from a node distance calculation each of the one or more sub-trees that are not part of a first portion of the first condensed DOM tree that corresponds to the first subsection;
   calculating using a tree distance algorithm a node distance metric between each nonexcluded sub-tree within the first sub-tree of the first condensed DOM tree and one or more nonexcluded sub-trees within the second condensed DOM tree, wherein the node distance metric increases as an amount of differences between sub-trees increases;
   identifying, at the computing device, a second subsection within the second version of the web page that corresponds to the first subsection using the first condensed DOM tree and the second condensed DOM tree;
   updating an aggregate website, based on the second subsection within the second version of the web page that corresponds to the first subsection within the first version of the web page.

12. The media of claim 11, wherein the qualifying nodes include one or more of text nodes, and nodes that are below a threshold size.

13. The media of claim 11, wherein the differences include one or more of adding a new node to a sub-tree, deleting a node from a sub-tree, and editing a node in a sub-tree.

14. The media of claim 11, wherein node distance calculation is performed using a parallel algorithm.

15. The media of claim 11, wherein the computing device is a proxy server, and wherein the method further includes communicating the second subsection to an application on a mobile communication device.

16. The media of claim 11, wherein the method further includes displaying the second subsection on a user interface that does not display the rest of the web page.

* * * * *